United States Patent
Klinger

(10) Patent No.: US 11,046,354 B2
(45) Date of Patent: Jun. 29, 2021

(54) STEERING SYSTEM

(71) Applicant: AUDI AG, Ingolstadt (DE)

(72) Inventor: Thomas Klinger, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 301 days.

(21) Appl. No.: 16/293,864

(22) Filed: Mar. 6, 2019

(65) Prior Publication Data

US 2019/0276070 A1    Sep. 12, 2019

(30) Foreign Application Priority Data

Mar. 7, 2018 (DE) .................... 10 2018 203 422.2

(51) Int. Cl.
| | |
|---|---|
| *B62D 5/00* | (2006.01) |
| *B62D 5/04* | (2006.01) |
| *B62D 15/02* | (2006.01) |

(52) U.S. Cl.
CPC ............. *B62D 5/001* (2013.01); *B62D 5/005* (2013.01); *B62D 5/0433* (2013.01); *B62D 15/0285* (2013.01)

(58) Field of Classification Search
CPC ...... B62D 5/001; B62D 5/005; B62D 5/0433; B62D 15/0285
USPC ........................................................ 180/402
See application file for complete search history.

(56) References Cited

U.S. PATENT DOCUMENTS

| | | | |
|---|---|---|---|
| 5,803,202 A | 9/1998 | Bohner et al. | |
| 5,835,870 A * | 11/1998 | Kagawa | B62D 1/28 701/23 |
| 2015/0006033 A1 * | 1/2015 | Sekiya | B62D 5/001 701/41 |
| 2015/0175199 A1 * | 6/2015 | Kuramochi | B60W 30/045 701/41 |
| 2016/0368522 A1 | 12/2016 | Lubischer et al. | |
| 2016/0375926 A1 | 12/2016 | Lubischer et al. | |
| 2017/0051797 A1 * | 2/2017 | Yamatani | B62D 5/003 |

(Continued)

FOREIGN PATENT DOCUMENTS

| | | |
|---|---|---|
| DE | 19539101 C1 | 2/1997 |
| DE | 198 41 913 A1 | 3/2000 |

(Continued)

OTHER PUBLICATIONS

European Examination Report dated Dec. 21, 2020, in connection with corresponding EP Application No. 19159921.6 (11 pp., including machine-generated English translation).

(Continued)

*Primary Examiner* — Jacob B Meyer
*Assistant Examiner* — Sophia Marie McGuire
(74) *Attorney, Agent, or Firm* — Maier & Maier, PLLC

(57) ABSTRACT

A steering system for a vehicle, including an input shaft, via which a steering force can be input by a steering element, an output shaft acting on a steering actuating mechanism, a coupling for connecting and disconnecting the input shaft and the output shaft with and from each other, respectively, and at least one actuator, by which the coupling can be actuated to couple and uncouple the input shaft and the output shaft with and from each other, wherein in the uncoupled state, the output shaft is independently rotatable relative to the input shaft in such a manner that a steer-by-wire drive controllable by a control unit is provided.

12 Claims, 2 Drawing Sheets

(56) References Cited

U.S. PATENT DOCUMENTS

| | | | | |
|---|---|---|---|---|
| 2017/0151975 A1* | 6/2017 | Schmidt | ............ | B62D 1/181 |
| 2017/0217475 A1* | 8/2017 | Shiina | ............ | F16D 27/02 |
| 2017/0282962 A1* | 10/2017 | Sekikawa | ............ | F16C 19/522 |
| 2017/0282964 A1* | 10/2017 | Sekikawa | ............ | B62D 5/001 |
| 2017/0327143 A1* | 11/2017 | Aramoto | ............ | F16D 15/00 |
| 2019/0118854 A1* | 4/2019 | Tate | ............ | F16H 25/2252 |
| 2020/0130725 A1* | 4/2020 | Ishimura | ............ | B62D 5/006 |
| 2020/0391784 A1* | 12/2020 | Saito | ............ | F16D 65/16 |

FOREIGN PATENT DOCUMENTS

| | | |
|---|---|---|
| DE | 102007043135 A1 | 3/2009 |
| EP | 1 585 662 B1 | 1/2007 |
| EP | 3 202 641 A1 | 8/2017 |
| WO | 2016/023691 A1 | 2/2016 |

OTHER PUBLICATIONS

The extended European search report dated Jul. 12, 2019, in corresponding European patent application No. 19159921.6; including partial machine-generated English language translation; 12 pages.

Office Action dated Jan. 20, 2020 in corresponding Korean Application No. 10-2019-0026328; 13 pages including English-language translation.

Examination Report dated Jan. 31, 2019 of corresponding German application No. 10 2018 203 422.2; 14 pages.

\* cited by examiner

STEERING SYSTEM

FIELD

Embodiments of the invention relate to a steering system.

BACKGROUND

Steering systems are generally configured such that a steering element and a steering actuating mechanism are mechanically coupled together at all times. In recent years, however a variety of steering system were proposed and realized in which it was possible to switch between a coupled state, in which a steering element and a steering actuating mechanism are mechanically coupled together, and an uncoupled state, in which the steering element and the steering actuating mechanism are mechanically uncoupled from one another. In the uncoupled state, rotational movements may be sensed by the steering element by way of sensors and then converted into a steering motion of the actuating mechanism via a control system and via actuators controlled by it, or alternatively, the control system independently generates steering commands based on sensor data and then converts these into a steering motion of the actuating mechanism by actuating the actuators. The uncoupled state is typically referred to as a steer-by-wire configuration, and it is used, for instance, when the steering characteristic must be modified as a function of the speed, when a steering intervention must be made in situations beyond the control of the driver, for instance in order to prevent accidents, or if certain driving maneuvers are to be performed independently by the vehicle for enhanced driving comfort, such as automatic parallel parking.

Generally, in cases in which the steer-by-wire configuration is active, the actual steering motions of the vehicle are converted into a position of the steering element via servo drives by way of feedback for the driver.

A steering system of the aforementioned type, comprising a coupling arrangement for connecting a steering element with a steering actuating mechanism when needed is described, for instance, in EP 3 202 641 A1 and in US 2017/0217475 A1. It is proposed there that a steering system be provided that couples or uncouples a first part of a steering shaft, which is connected with a steering element, with a second part of a steering shaft, which is connected with a steering actuating mechanism, by means of a switchable coupling, as needed. In the uncoupled standard operation, steering is done by means of a control unit on the basis of sensor data, wherein the control unit sets the steering position by means of a motor actuated by it, which acts on the steering actuating mechanism. The first part of the steering shaft, with which the steering element is connected, is acted upon by a feedback unit in the form of a servo drive that is controlled by the control unit based on sensor data, thereby giving the person actuating the steering element a sensation of steering control.

These servo drives that serve the purpose of providing force feedback are expensive, however, and require a considerable amount of assembly space. There is therefore a desire for a simple cost-effective solution.

SUMMARY

Departing from the aforementioned prior art, the task of the invention is to provide a steering system that allows for steering interventions controlled by a control unit that avoids the aforementioned disadvantages, and in particular dispenses with an active feedback unit, and in which the uncoupling of the steering element from the steering actuating mechanism is not experienced by the person actuating the steering element as a steering element of which the actuation becomes abruptly unresisting.

Advantageous Embodiments are Disclosed in the Dependent Claims.

The point of departure is a steering system for a vehicle comprising an input shaft via which a steering force from a steering element can be input, an output shaft that acts on a steering actuating mechanism, a coupling for connecting and disconnecting the input shaft and the output shaft with and from each other, and at least one actuator by means of which the coupling can be actuated, in order to couple and uncouple the input shaft and the output shaft with and from each other. Such arrangements are known in combination with steer-by-wire configurations, and they create the condition that in the uncoupled state, the output shaft is independently rotatable relative to the input shaft in such a manner that a steer-by-wire drive that is controllable by a control unit determines the steering angle as it acts on the steering actuating mechanism under control by a control unit. In such steering systems, typically, a safety function is provided, onto which the steering system can fall back in case of a failure of the steer-by-wire function, in which the input shaft and the output shaft are coupled in a torque-proof connection.

These days, the aforementioned control unit is typically a computer-supported control unit which uses sensors to capture data, uses software to process them, and actuates actors depending on the processing results. Since such control units are commonly known, there is no need to further address their structure.

In order to solve the task, it is proposed to embody the steering system such that the at least one actuator controlled by the control unit can move the coupling into two discrete switch positions, wherein the coupling in the first switch position connects the input shaft and the output shaft in a torque-proof connection with each other, and in the second switch position uncouples the input shaft from the output shaft and then fixates the input shaft relative to a fixed part of the vehicle, for instance to the vehicle body, via a direct or an indirect connection. It is further proposed that the output shaft be rotatable independently of the input shaft by means of the steer-by-wire drive controlled by the control unit only in the second switch position. By way of the proposed steering system, advantageously, a steer-by-wire function is made possible, which cost- and space-effectively does not require feedback by means of a servo drive, and which nevertheless involves feedback in the form of force feedback. In particular, the steering wheel can at no time be turned freely, such that the driver advantageously never experiences a feeling of a lack of safety.

It is particularly advantageous when the direct or indirect connection between the input shaft and the fixed part of the vehicle in the second switch position is formed by at least one pivoting spring mechanism between the input shaft and the fixed part of the vehicle in such a manner that the input shaft can be rotated in both rotational directions against the force of the at least one spring element by a predefined angle rate by means of the steering element connected with it, and reaches limit stops directly or indirectly connected with the fixed part of the vehicle in case of a rotation beyond this angle rate. This design results in a force feedback that is a function of the rotation angle of the input shaft and therefore of the steering element, for instance a steering wheel, when the steer-by-wire function is activated or applied. This clearly provides the driver with increased safety than an abruptly blocked or even a freely rotatable steering element. It has proven to be particularly efficacious that the pre-defined angle rate be greater than 5° and less than 30°, preferably greater than 5° and less than 20°, and most preferably greater than 5° and less than 15°.

In order to advantageously ensure that the steering element is at no time freely rotatable, the coupling is formed such that in the interim segment between the first switch position and the second switch position through which it moves dynamically, it connects the input shaft and the output shaft with each other in a torque-proof connection during the transition from the first switch position to the second switch position, thereby fixing the input shaft relative to a fixed part of the vehicle, for instance to the vehicle body, in such a manner that the input shaft is at no time freely rotatable. The transition time of the transition segment is advantageously dimensioned such that when switching from the first switch position to the second switch position, the input shaft connected to the vehicle body does not reach the limit stops when a steering force is applied to the input shaft, in this manner, when switching from direct steering control to the steer-by-wire function, the force feedback on the input shaft is substantially possible without uncomfortable force surges on the steering element, for instance the steering wheel.

In a further design of the steering system, it is advantageous that during standard operation, when switching from the second switch position to the first switch position, the control unit synchronizes the angle setting of the output shaft with the angle setting of the input shaft in such a manner that the steer-by-wire drive, controlled by the control unit, sets the steering actuating mechanism to the angle setting of the input shaft that was determined by means of at least one sensor and that the control unit then shifts the coupling into the first switch position by actuating the at least one actuator. By way of these measures, the steering actuating mechanism, and with it, for instance, the wheels of a vehicle, can be arranged by the control unit by means of the steer-by-wire drive in the position defined by the angle setting of the input shaft, such that a rotated coupling of the input shaft with the output shaft is securely prevented. It is advantageous for the switching from the second switch position to the first switch position to be done when the input shaft, and more preferably the vehicle, is in a stationary position.

In order to provide a safeguard for the event of a failure of the activated steer-by-wire function, it is advantageous that an emergency switch from the second switch position to the first switch position be provided, such that when the emergency switch is triggered, the control unit moves the coupling into the first switch position by actuating the at least one actuator, independently of the angle setting of the input shaft. By way of this measure, the uninterrupted steering of the vehicle is guaranteed even in case of a system failure.

For the embodiment of the coupling that generates the respective connections in the first switch position or in the second switch position, apart from a form-fitting connection, a frictional connection, or a force traction connection may be provided. Obviously, a combination of these connection options is conceivable as well, for instance is the connection between the input shaft and the output shaft in the first switch position is an interlocking connection, and the direct or indirect connection between the input shaft and a fixed part of the vehicle in the second switch position is a frictional connection or a force traction connection.

For the advantageous embodiment of the coupling, it is provided that it feature at least one switch element, wherein the coupling by means of the at least one switch element connects the input shaft and the output shaft with each other in a torque-proof connection in the first switch position, and disconnects the input shaft from the output shaft and fixates it by means of the at least one switch element relative to a fixed part of the vehicle, for instance the vehicle body in the second switch position. For financial reasons, the provision of a single switch element that performs all these tasks is preferable, but there might be a constructional necessity to provide two switching elements for the coupling, for instance, wherein the first switch element connects the input shaft and the output shaft with each other in a torque-proof connection in the first switch position and disconnects the input shaft from the output shaft in the second switch position, whereas the second switch element fixates the input shaft relative to a fixed part of the vehicle in the second switch position severs this fixation in the first switch position.

In order to actuate the at least one switch element, advantageously, at least one actuator is provided, which features a power-developing drive which is a member of one of the groups of electrical drives, mechanical drives, pneumatic drives, hydraulic drives, pyrotechnic drives, or any combination of these drives. Obviously, these drive forms can be mutually combined. Thus, it is conceivable that in the general case, an electromagnetic or electromotive drive be provided, or if respective power sources are available, a pneumatic or a hydraulic drive, though for a substantially instantaneous and safe emergency switch from the second switch position to the first switch position, an additional pyrotechnic drive may be advantageous as well.

BRIEF DESCRIPTION OF THE FIGURES

Additional embodiments and advantages of the invention will be further explained below, based on the drawings. The figures show as follows.

DETAILED DESCRIPTION

For the following description, it is assumed that the steering system according to the invention is built into a passenger vehicle. The centerpiece of the steering system is a coupling, the structure and functioning of which is described first, based on the example shown in FIG. 1a through FIG. 1c. The embodiment is shown in a highly simplified manner, and only shows one of a variety of realization options. The arrangement shown is in three different phases of a switch from a first switch position to a second switch position. Identical reference numbers are used for identical parts.

Figure 1A:
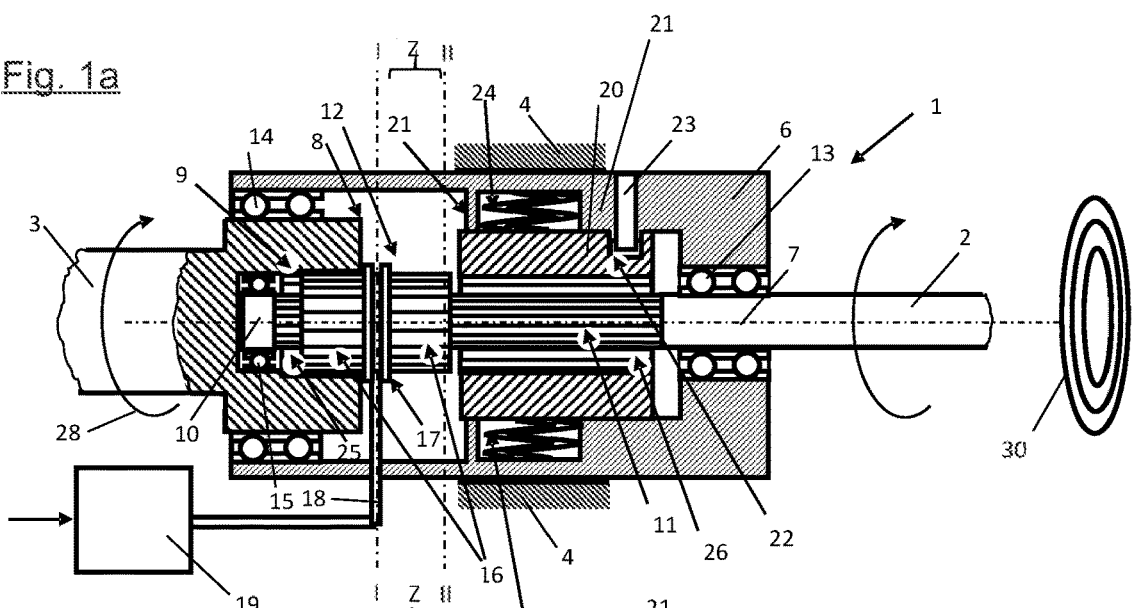
FIG. 1a shows a schematic diagram of the coupling arrangement of the steering system in a sectional view.
Figure 1B:
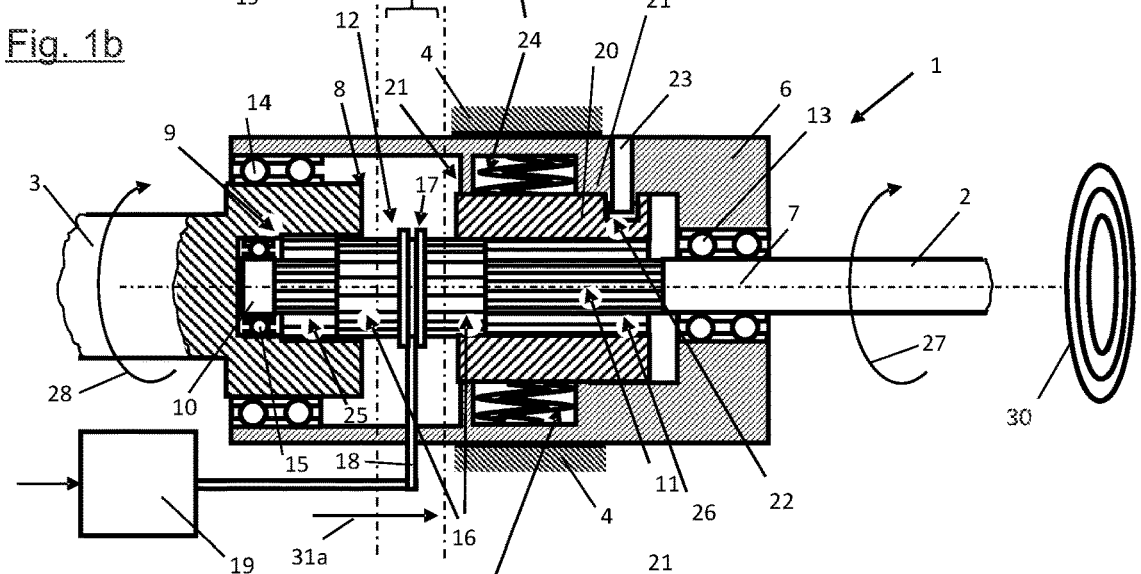
FIG. 1b shows another schematic diagram of the coupling arrangement of the steering system in a sectional view.
Figure 1C:
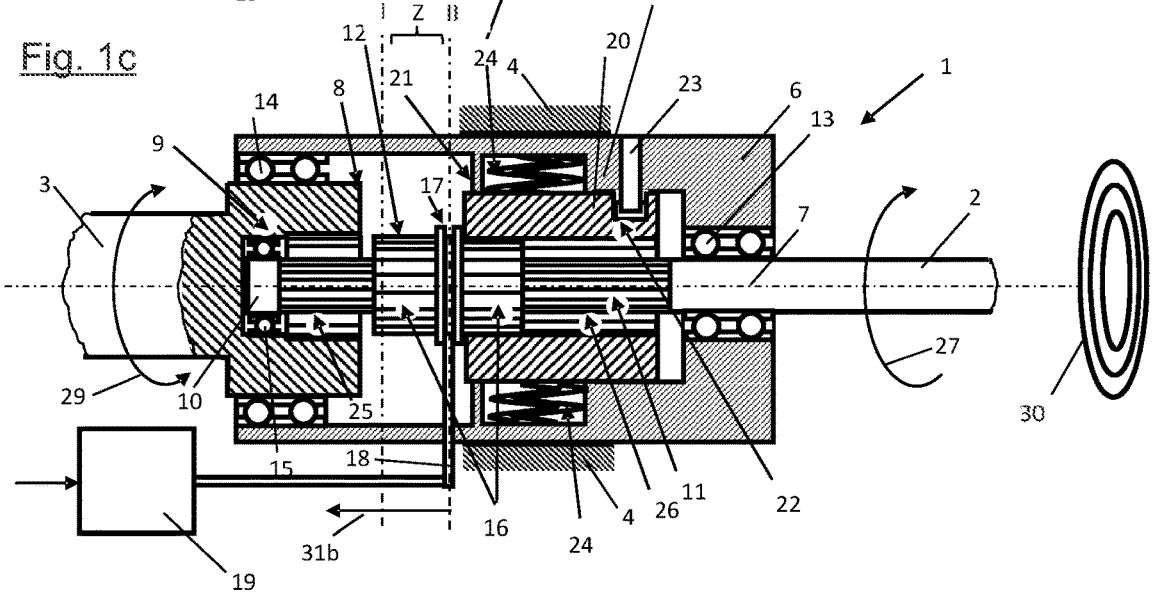
FIG. 1c shows another schematic diagram of the coupling arrangement of the steering system in a sectional view.

According to the illustrations of FIG. 1a through FIG. 1c, the coupling 1 serves for connecting an input shaft 2 with an output shaft 3 in a first switch position and for disconnecting them in a second switch position and fixating the input shaft 2 relative to the vehicle body 4 of the passenger vehicle 5 (FIG. 2) instead. The coupling 1 features a cylindrical enclosure 6 that is arranged solidly on the vehicle body 4. In the enclosure 6, the input shaft 2 is rotatably positioned coaxial on its central axis 7 by means of a first bearing 13, and the output shaft 3 is rotatably positioned coaxial on its central axis by means of a second bearing 14. The central axis 7 is therefore also the rotary axis of the input shaft 2 and of the output shaft 3.

At the end 8 facing the input shaft 2, the output shaft 3 features a recess 9, in which the shaft end 10 of the input shaft 2 facing the output shaft 3 is rotatably positioned by means of a third bearing 15. Towards its open end, the recess 9 features an internal gearing 25, which interacts with a shift sleeve 12 as will be explained further below.

The shift sleeve 12 is arranged on the input shaft 2, between the mount of the input shaft 2 in the output shaft 3 and its mount in the enclosure 6, in an axially slidable and torque-proof connection. For these purposes, the input shaft 2 features in this segment an axially extending external gearing 11, which corresponds and interacts with an axially extending internal gearing (not visible in the illustration) of the shift sleeve 12.

The shift sleeve 12 further features an axially extending external gearing 16, which is divided approximately in the middle in terms of its axial extension into two parts by way of a circulating shifting gate 17. The shifting gate 17 is engaged by a shift finger 18 which can be moved parallel to the central axis 7 through the actuation of an actuator 19, thus axially moving the shift sleeve 12. The outside diameter of the shift sleeve 12 and its external gearing 16 correspond with the interior diameter of the recess 9 and its internal gearing 25 in such a manner that the shift sleeve 12 engages the output shaft 3 in a torque-proof connection, given a respective axial position.

As an additional element, a cylindrical coupling sleeve 20 is positioned coaxially to the central axis 7 in the enclosure 6 of the coupling 1. The coupling sleeve 20 is positioned in the interior of the enclosure 6 by peripheral shapes 21 relating to its radial position and arranged such that it features an axial distance to the end 8 of the output shaft that is less than the axial extension of the shift sleeve 12. The shapes 21 and the outer surface of the coupling sleeve 20 form a slide bearing, such that the coupling sleeve 20 is rotatable around the central axis 7 in the interior of the enclosure 6. At the end facing the first bearing 13, the coupling sleeve 20 further features a groove 22 extending on its outer side in a peripheral direction over a defined angle range, and which is engaged by a pin 23 penetrating the enclosure 6. In this manner, the coupling sleeve 20 is axially fixated in the enclosure 6 and rotatable in a peripheral direction within the angle range defined by the longitudinal dimension of the groove 22. The angle range was selected such that departing from of a middle position, the coupling sleeve is rotatable at an angle rate of approx. plus/minus 10° in the enclosure 6. The coupling sleeve 20 further features an internal gearing 26, wherein the interior diameter of the coupling sleeve 20 and its internal gearing 26 correspond with the outside diameter of the shift sleeve 12 and its external gearing 16 in such a manner that the shift sleeve 12 engages the coupling sleeve 20 in a torque-proof connection, given a respective axial position.

Between the shapes 21 in the enclosure 6, spring elements 24 are arranged, which engage the enclosure 6 with one of their two ends, and the outer surface the coupling sleeve 20 with their other end. In the state in which it is not coupled with the input shaft 2, the coupling sleeve 20 is thus arranged in the aforementioned middle position, spring-loaded in both rotational directions in terms of its rotation angle. The coupling sleeve 20 is therefore positioned rotatably in the enclosure 6 against the force of the spring elements 24, departing from the middle position by approx. plus/minus 10°, and at a rotation angle that is greater than plus/minus 10° it reaches the limit stops formed by the longitudinal dimension of the groove 22.

Departing from the aforementioned structure of the coupling 1, a switching process of the coupling will now be described in greater detail in combination with the illustrations in FIG. 1a through FIG. 1c. Departing from FIG. 1a, in which the coupling is shown in its first switch position (first switch position I), the switching is performed by dynamically transitioning through an interim position Z, which is illustrated in FIG. 1b, and ends when the second switch position (second switch position II) illustrated in FIG. 1c is reached. The switch positions I and II are indicated in the illustrations by dot-dashed lines, the interim position Z being between them.

According to the illustration of FIG. 1a, the shift finger 18 is in the first switch position marked as I. In this switch position I, the shift collar that can be axially moved by means of the actuator 19 via the shift finger 18 and the shifting gate 17 is in the end position which in the illustration is on the left side. The external gearing 16 of the shift sleeve 12 engages the corresponding internal gearing 25 of the recess 9. On the other hand, the shift sleeve 12 is connected with the input shaft 2 in a torque-proof connection via its internal gearing (not visible in the illustration) and the corresponding external gearing 11 of the input shaft. A torque applied on the input shaft 2 in the direction of the torque arrow 27 is therefore transmitted 1:1 onto the output shaft 3, as shown by the torque arrow 28. Therefore, if torque is directly or indirectly applied to the input shaft 2 via a steering wheel 30 in the direction of the torque arrow 27, the output shaft 3 will also rotate, at a 1:1 ratio. The operating force needed for the actuation of the steering actuating mechanism 33 (FIG. 2) powered by the output shaft 3 communicates to the steering person (not shown) a natural sensation of steering control.

If a switch signal is now applied to the actuator 19 by the control unit 32 (FIG. 2), the actuator moves the shift finger 18, and therefore the shift sleeve 12, in the direction which in the illustration of FIG. 1b is to the right, as indicated by motion arrow 31a. In doing so, the assembly moves through an interim position Z, in which the input shaft 2 is connected with the output shaft 3 via its external gearing 11, the corresponding internal gearing of the shift sleeve (not visible in the illustration), the external gearing 16 of the shift sleeve 12, and the corresponding internal gearing 25 of the recess 9, on the one hand, and with the spring elements 24 via the external gearing 11, the corresponding internal gearing (not visible in the illustration) of the shift sleeve 12, the external gearing 16 of the shift sleeve 12, and the corresponding internal gearing 26 of the coupling sleeve 20, and therefore via the enclosure 6 with the vehicle body 4, on the other hand.

As a result of this double connection of the input shaft 2 with the output shaft 3 as well as with—in a pivoting connection—with the vehicle body 4, the input shaft 3 [sic] and therefore the steering wheel 31 are at no time freely rotatable, nor are they abruptly blocked during the switch from the first switch position I to the second switch position II. In order to avoid any abrupt blocking, the switching time for the transition of the interim position Z is dimensioned such that in this time, the steering wheel cannot be rotated so far that the coupling sleeve 20 would be moved from its middle position until the end of the groove 22, that is, until it would reach the limit stop. Thus, the steering person (not shown) retains a nearly natural sensation of steering control, since the force required for the actuation of the steering actuating mechanism 33 (FIG. 2) us only overlaid with an additional force, which increases with the rotation angle of the steering wheel 30.

As the shift sleeve 12 moves further in the direction of the second switch position II, the external gearing 16 of the shift sleeve 12 disengages from the internal gearing 25 in the recess 9, such that upon rotation of the input shaft 2 (of the steering wheel 30), the steering control sensation communicated to the steering person (not shown) is determined solely by the force of the spring elements 24. The time at which the shift sleeve 12 disengages from the output shaft 3 is determined by the degree in which the shift sleeve 12 is greater in its axial spread than the axial distance between the output shaft 3 and the coupling sleeve 20. The pivoting connection between the input shaft 2 and the vehicle body 4 remains, as long as the coupling 1 remains in the switch position II illustrated in FIG. 1c. If, due to the respective application of a switch signal of the actuator 19 by the control unit 32 (FIG. 2), a switch from the second switch position II to the first switch position I is initiated, the aforementioned process takes place in the reverse direction and in the reverse order, as indicated by the second direction arrow 31b (FIG. 1c). In order to avoid repetitions, a detailed description of this reverse switching process is done away with, and reference is made to the aforementioned explanations instead.

Figure 2:
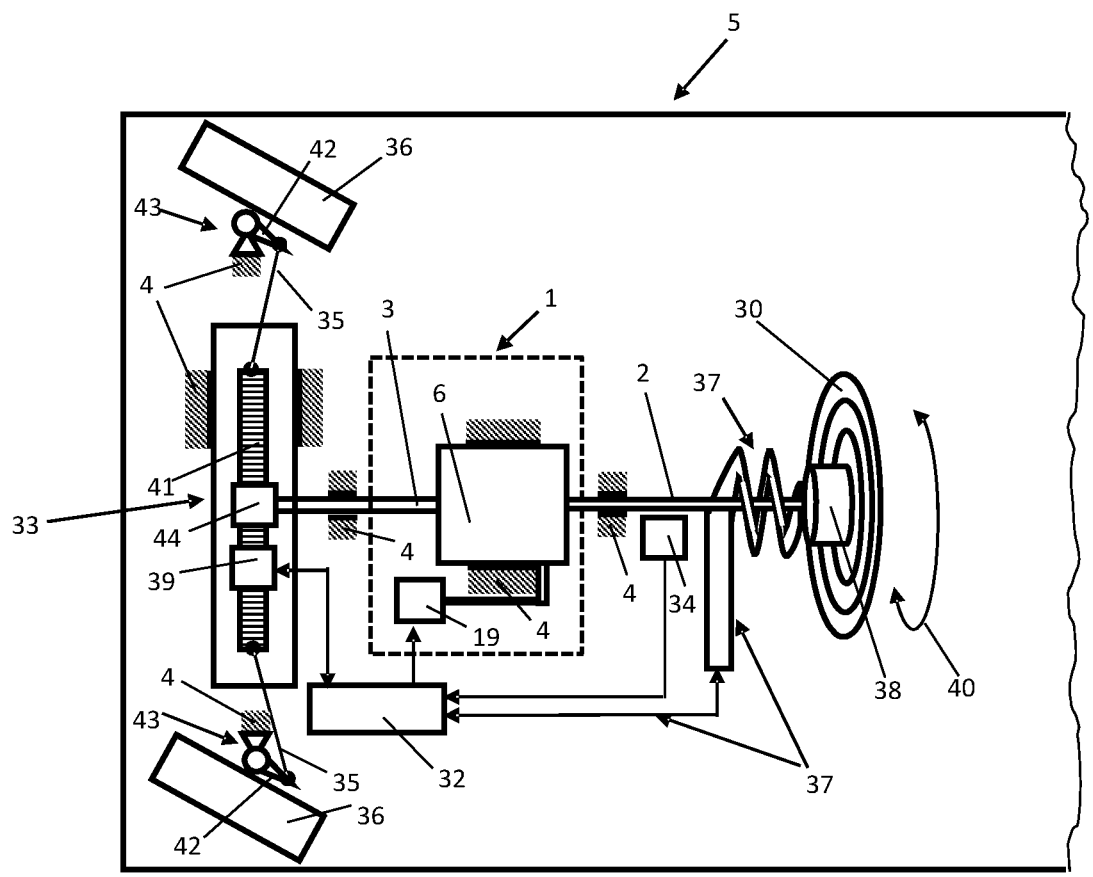
FIG. 2 shows a schematic diagram of the steering system in a passenger vehicle.

In order to explain the interaction of the coupling 1 with the other components of the steering system, such a steering system is exemplarily shown in FIG. 2 as a simplified schematic diagram. As previously explained above, the steering system is built into the passenger vehicle 5 that is shown here in a partial illustration, and features the aforementioned coupling 1, which is connected with its enclosure 6 to the vehicle body 4. The input shaft 2 is arranged on the input side of the coupling 1. The output shaft 3 is on the output side. The input shaft 2 and the output shaft 3 are rotatably positioned on the vehicle body 4. A steering wheel 30 is arranged on the end of the input shaft 2 that is facing away from the coupling 1, via which the steering motions can be input, as indicated by a rotational arrow 40. The steering wheel 30 features supplementary components 38, which may be an airbag, switching elements, and/or display elements. These are attached to the control unit 32 attached via a connecting cable which is wrapped around the input shaft multiple times. The connecting cable 37 is designed such that it allows for steering motions by winding and unwinding. The angle range, within which the steering wheel 30 can be rotated and within which the rotation is absorbed by way of this winding and unwinding will be referred to here as a winding reserve. Furthermore, a sensor 34 is provided to detect the rotation of the input shaft, which continuously transmits the rotation angle of the input shaft 2 to the control unit 32.

The end of the output shaft 3 facing away from the coupling 1 acts on a steering gear 44, which is a part of the steering actuating mechanism 33. The steering actuating mechanism 33 is solidly arranged on the vehicle body 4. The steering gear 44 may be a direct steering system in the form of a steering gear, a servo steering gear, or a superimposed steering system. In this example, the steering actuating mechanism 33 further comprises a toothed steering rack 41, the respective ends of which are connected with track rods 35, wherein the respective other ends of the track rods engage steering levers 42 that act on a wheel suspension 43 that is rotatably connected to the vehicle body 4 such that the linear movement of the steering rack 41 transmits a steering angle to the wheel suspension 43, and thus to the wheels 36. The steer-by-wire function is realized in the selected example by a steer-by-wire drive 39, which is also a part of the steering actuating mechanism 33 and which acts on the steering rack 41 and is bidirectionally connected with the control unit 32. On the one hand, due to this bidirectional connection, the steer-by-wire drive 39 can be actuated by the control unit 32 to set a certain steering angle for the wheels 36. On the other hand, it provides sensor data about the set steering angle from a sensor (not shown) in the steer-by-wire drive 39.

As previously explained, on the one hand, the steering system according to the example of FIG. 2 is meant to realize normal steering operation in which the steering wheel angle is the value determining the steering angle of the wheels 36, and on the other hand it is meant to realize a steer-by-wire function, in which the steering angle of the wheels 36 is dictated via the control unit 32 and is entirely independent of the steering wheel angle. For these purposes, when switching from normal steering operation to the steer-by-wire function, or vice versa, from the steer-by-wire function back to the normal steering operations, some conditions must be met. For the following embodiments it is assumed that switching from normal steering operation to the steer-by-wire function can only take place when either an automated driving maneuvers must be performed, for instance in order to parallel-park the vehicle automatically, or in an emergency situation that is beyond the driver's control, when a steering intervention must be performed by the control unit 32 based on sensor data, for instance in order to prevent an accident or to reduce its consequences.

Based on the assumption that the steering system is in normal steering mode, the switch is made independently of the steering angle at that particular time, and therefore also independently of the steering wheel angle that dictated it. The switching process essentially consists of the switch of coupling 1 as described above in the context of FIG. 1a through FIG. 1c from the first switching position (switching position I) to the second switch position (switch position II). Only after the termination of this switching process, the steer-by-wire function, controlled by the control unit 32, takes over, and the steer-by-wire drive 39 moves the toothed steering rack 41 dependent on the movement of the vehicle, meaning that it determines the steering angle required for performing the driving maneuvers dependent on the movement of the vehicle.

Once the driving maneuvers have been performed, the coupling 1 is switched back by the control unit 32 from the second switch position (switch position II) to the first switch position (switch position I). A distinction must be made here between two cases: regular reversion and emergency reversion. In the event of a regular reversion, the control unit 32 uses the sensor 34 to monitor the steering wheel angle at that particular moment and directs the steer-by-wire drive 39 to set the steering angle to a steering angle that corresponds to the steering wheel angle at that particular moment. Only then follows the switching of the coupling 1 from switch position I to switch position II (cf. FIG. 1a through FIG. 1c). This is to ensure that the input shaft 2 and the steering wheel 30 are not coupled with the output shaft 3 in a contorted position. Since during the synchronization of the steering angle and the steering wheel angle, a steering motion of the wheels 36 is performed, this process is preferably performed when the vehicle is stationary, ideally while the steering wheel is not being actuated, since the latter can be rotated in switch position II by plus/minus 10°.

As previously mentioned, a situation may occur in which, while the coupling 1 is in the second switch position, controllability of the passenger vehicle 5 via the steering wheel 30 must be restored immediately. This may be the case, for instance, after an avoidance maneuver was performed by the steer-by-wire function, or in case of a steer-by-wire function failure. In the event of such an emergency reversion from the second switch position (switch position II) to the first switch position (switch position I), a synchronization of the steering angle and the steering wheel angle is not possible for safety reasons. Instead, reversion to the first switch position of the coupling 1 is done without a steering motion of the wheels 36 and without a time lag. After such an emergency reversion, the steering wheel may be contorted, but the passenger vehicle 5 remains controllable without interruption.

Obviously, after an emergency reversion as described, the next time that the passenger vehicle 5 is in a stationary position, and possibly after the discontinuance of the failure, a synchronization of the steering angle and the steering wheel angle may be performed by first switching the coupling 1, controlled by the control unit 32, from the first switch position (switch position I) to the second switch position (switch position II), upon which the control unit 32 directs the sensor 34 to register the steering wheel angle as it is at that moment, and then directs the steer-by-wire drive 39 to set the steering angle to a steering angle that corresponds with the steering wheel angle of that moment. If in this position the coupling 1 is switched from switch position II to switch position I (cf. FIG. 1a through FIG. 1c), the contortion of the steering wheel has come to an end.

With respect to the emergency reversion from the second switch position (switch position II) to the first switch position (switch position I), in view of the layout of the winding reserve, it must be taken into account that the winding reserve, that is, the range within which the steering wheel 30 can be rotated and the rotation is absorbed by way of this winding and unwinding must cover the maximum possible contortion of the steering wheel 30 in case of an emergency reversion from the second switch position (switch position II) to the first switch position (switch position I).

The invention claimed is:

1. Steering system for a vehicle, comprising:
   an input shaft via which a steering force is input from a steering element, an output shaft acting on a steering actuating mechanism, a coupling for connecting and disconnecting the input shaft and the output shaft with and from each other, respectively, and at least one actuator, by means of which the coupling can be actuated to couple and uncouple the input shaft and the output shaft with and from each other,
   wherein in the uncoupled state, the output shaft is independently rotatable relative to the input shaft in such a manner that a steer-by-wire drive bidirectionally coupled to a control unit is provided, wherein the steer-by-wire drive is directed by the control unit to control the steering actuating mechanism and wherein the steer-by-wire drive is used by the control unit to determine the steering angle, and wherein in the coupled state, the input shaft and the output shaft are in a torque-proof connection with each other,
   wherein the steering system is formed such that the at least one actuator controlled by the control unit can move the coupling into two discrete shift position, wherein in the first switch position, the coupling connects the input shaft and the output shaft in a torque-proof connection with each other, and in the second switch position, on the one hand, it uncouples the input shaft from the output shaft and on the other hand fixates the input shaft relative to a fixed part of the vehicle by a direct or indirect connection, and in that in the second switch position, the output shaft can be rotated by the control unit by means of the steer-by-wire drive independently of the input shaft.

2. A steering system according to claim 1, wherein the direct or indirect connection between the input shaft and the fixed part of the vehicle in the second switch position is formed by at least one pivoting spring mechanism between the input shaft and the fixed part of the vehicle in such a manner that the input shaft can be rotated in both rotational directions against the force of the at least one spring mechanism by a predefined angle rate by means of the steering element connected with it, and reaches limit stops directly or indirectly connected with the fixed part of the vehicle in case of a rotation beyond this angle rate.

3. A steering system according to claim 2, wherein the predefined angle rate is greater than 5° and less than 30°.

4. A steering system according to claim 2, wherein the coupling is formed such that in the interim segment between the first switch position and the second switch position through which it moves dynamically, the coupling connects the input shaft and the output shaft with each other in a torque-proof connection during the transition from the first switch position to the second switch position, and fixates the input shaft relative to the fixed part of the vehicle in such a manner that the input shaft is at no time freely rotatable.

5. A steering system according to claim 4, wherein the transition time of the interim segment is advantageously dimensioned such that when switching from the first switch position to the second switch position, the input shaft connected pivotably to the fixed part of the vehicle does not reach the limit stops when a steering force is applied to the input shaft.

6. A steering system according to claim 1, wherein during standard operation, when switching from the second switch position to the first switch position, the control unit synchronizes the angle setting of the output shaft with the angle setting of the input shaft in such a manner that the steer-by-wire drive, controlled by the control unit, sets the steering actuating mechanism to the angle setting of the input shaft that was determined by means of at least one sensor and that the control unit then shifts the coupling into the first switch position by actuating the at least one actuator, and in particular, that the switching from the second switch position into the first switch position is done when the vehicle and/or the input shaft are in a stationary position.

7. A steering system according to claim 1, wherein an emergency switch from the second switch position to the first switch position is provided, wherein when the emergency switch is triggered, the control unit brings the coupling into the first switch position by actuating the at least one actuator, independently of the angle setting of the input shaft, and that the coupling generates the respective connection in the first switch position or in the second switch position by way of a form-fitting connection, a frictional connection, or a force traction connection, and that the coupling features at least one switch element, wherein in the first switch position, the coupling connects the input shaft and the output shaft in a torque-proof connection with each other by means of the at least one switch element, and in the second switch position, on the one hand, it uncouples the input shaft from the output shaft, and on the other hand it fixates the input shaft relative to a fixed part of the vehicle by means of the at least one switch element.

8. A steering system according to claim 7, wherein the coupling features two switch elements, wherein in the first switch position, the first switch element connects the input shaft and the output shaft with each other in a torque-proof connection, and in the second switch position disconnects the connection between the input shaft and the output shaft, whereas the second switch element in the second switch position fixates the input shaft relative to a fixed part of the vehicle and disconnects this connection in the first switch position.

9. A steering system according to claim 7, wherein the at least one switch element can be actuated by means of the at least one actuator.

10. A steering system according to claim 1, wherein the at least one actuator features a power-developing drive which is a member of one of the groups of electrical drives, mechanical drives, pneumatic drives, hydraulic drives, pyrotechnic drives, or any combination of these drives.

11. A steering system according to claim 3, wherein the coupling is formed wherein in the interim segment between the first switch position and the second switch position through which it moves dynamically, the coupling connects the input shaft and the output shaft with each other in a torque-proof connection during the transition from the first switch position to the second switch position, and fixates the input shaft relative to the fixed part of the vehicle in such a manner that the input shaft is at no time freely rotatable.

12. A steering system according to claim 8, wherein the at least one switch element can be actuated by means of the at least one actuator.

\* \* \* \* \*